(No Model.)  
2 Sheets—Sheet 2.
G. A. BOYDEN.
ENGINEER'S BRAKE VALVE.
No. 445,132.  Patented Jan. 20, 1891.
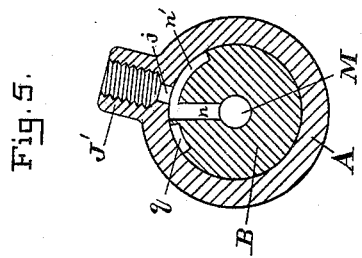
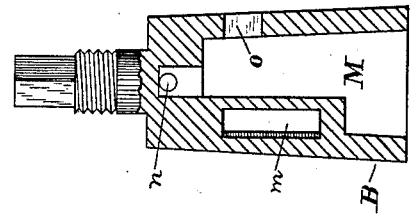
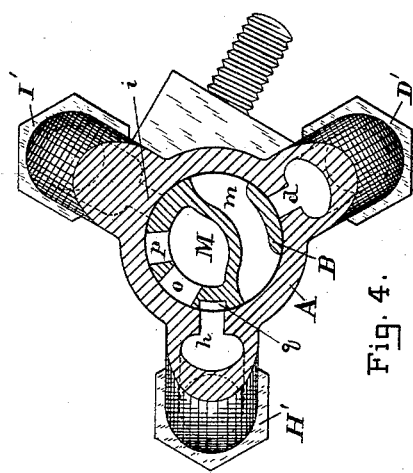
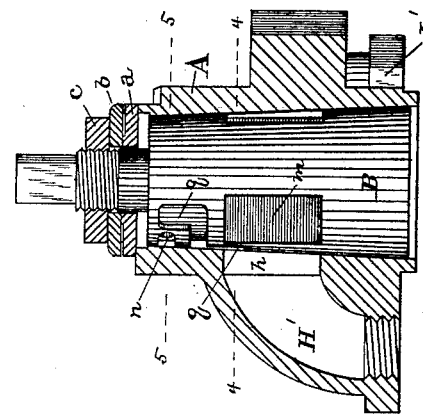
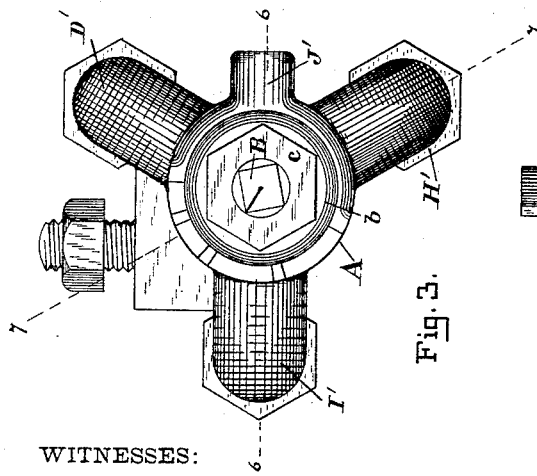
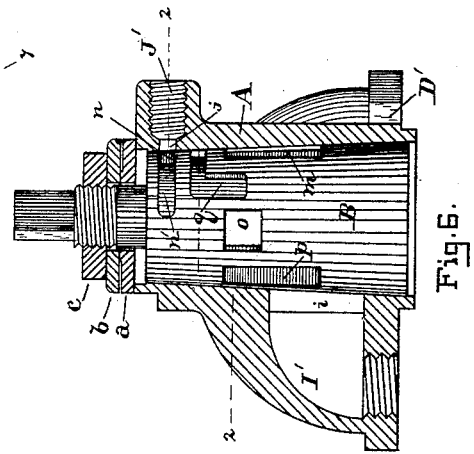
WITNESSES:
A. O. Babendreier.
Otto H. Ehlers.
INVENTOR:
Geo. A. Boyden
BY Chas. B. Mann
ATTORNEY.

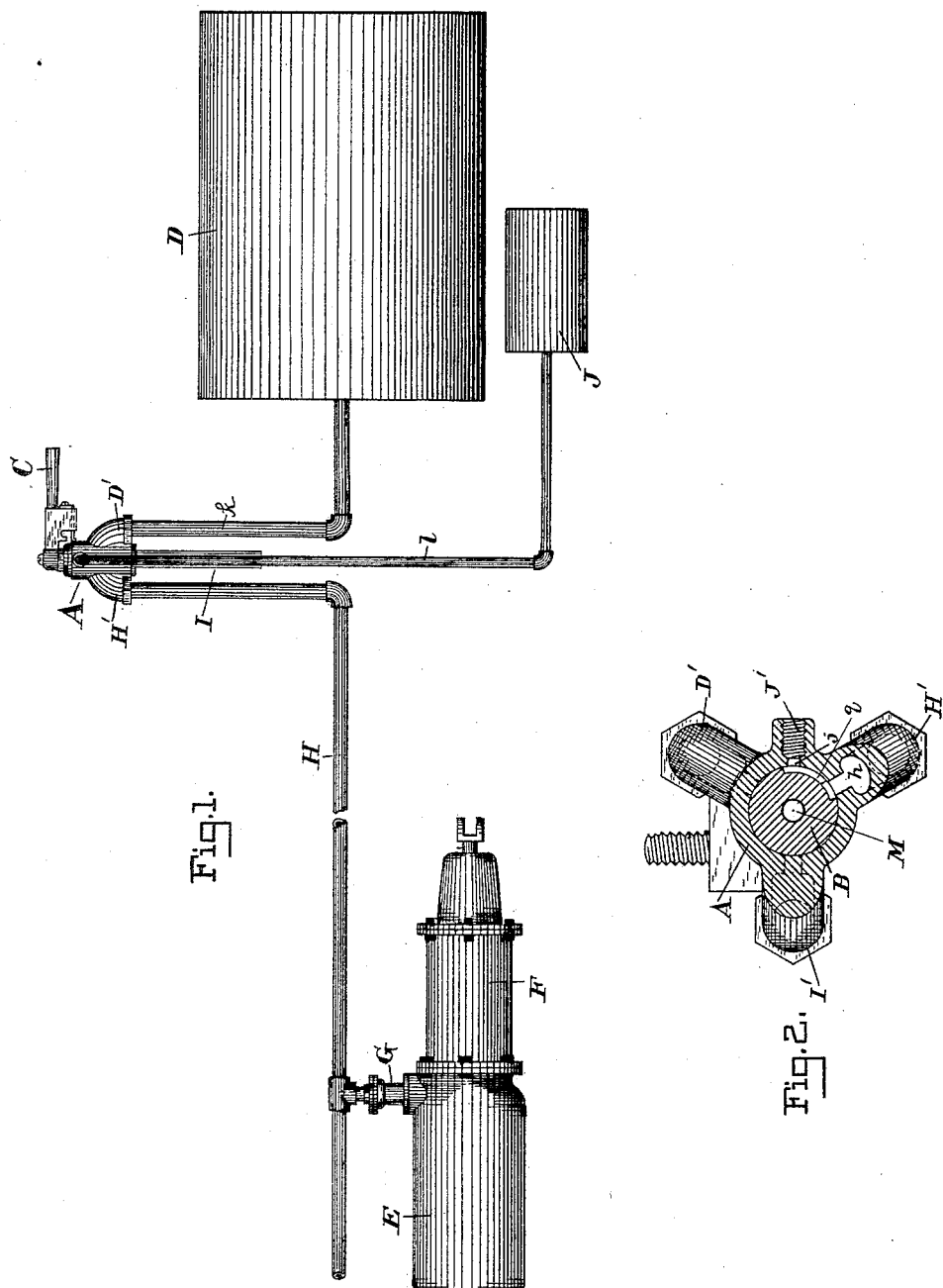

UNITED STATES PATENT OFFICE.

GEORGE A. BOYDEN, OF BALTIMORE, MARYLAND, ASSIGNOR TO THE BOYDEN BRAKE COMPANY, OF SAME PLACE.

ENGINEER'S BRAKE-VALVE.

SPECIFICATION forming part of Letters Patent No. 445,132, dated January 20, 1891.

Application filed June 10, 1890. Serial No. 354,925. (No model.)

*To all whom it may concern:*

Be it known that I, GEORGE A. BOYDEN, a citizen of the United States, residing at Baltimore, in the State of Maryland, have invented certain new and useful Improvements in Engineer's Brake-Valves, of which the following is a specification.

This invention relates to air-brake devices to be employed on the locomotive for controlling the air that is under pressure in a main reservoir, the train-pipe, and the automatic air-brake mechanism on the cars.

The invention has for its object to provide means for preventing the release of the brakes on the forward cars of a long train when stopping the flow of air discharging from the train-pipe. The release of the brakes on the forward cars here referred to has been occasioned by the compressed air at the rear end of the train-pipe expanding and flowing into the forward end when the discharge thereat is suddenly stopped.

The invention is illustrated in the accompanying drawings, in which—

Figure 1 is a view of the several parts of an automatic air-brake with my improvement attached. Fig. 2 is a top view of the improved engineer's brake-valve, partly in horizontal section, on the three parallel planes indicated by the line 2 2 in Fig. 6. Fig. 3 is a top view of the engineer's brake-valve without the handle. Fig. 4 is a horizontal section of same on line 4 4 in Fig. 7. Fig. 5 is a horizontal section of same on the line 5 5. Fig. 6 is a vertical section of the casing or shell of the engineer's brake-valve and a side view of the plug thereof on line 6 6 in Fig. 3. Fig. 7 is a similar view to that shown in Fig. 6, but taken on the line 7 7 in Fig. 3. Fig. 8 is a vertical section of the valve-plug.

The letter A designates the case of the engineer's valve, made in one piece; B, the plug turning in the case, and C the handle or lever thereof; D, the main reservoir; E, the auxiliary reservoir; F, the brake-cylinder; G, the valve commonly called the "triple valve," and H the train-pipe. The function of all these parts as commonly used is well understood.

The engineer's valve-casing A has a central conical bore extending from the top to the bottom, the larger portion being at the bottom. This casing has also four hollow projections or ports D' H' I' J', the first three of which are situated equidistant apart. One of these projecting ports D' is connected by a pipe $k$ with the main air-reservoir D, and also with a port $d$, leading to the conical bore of the case. Another projecting port H' establishes communication between the train-pipe H and a port $h$, leading to the said conical bore. Another projecting port I' establishes communication between a pipe I, leading to the engine-brake, and a port $i$, leading to the conical bore. The fourth projecting port J' in like manner establishes communication between a port $j$, leading to the conical bore, and a pipe $l$, leading to a small tank or cylinder J for receiving the expanded air flowing from the rear end of the train-pipe H when the discharge at the forward end has been suddenly stopped, thereby avoiding the release of the brakes connected with the forward end of the train-pipe, such release being due to the expansion of the compressed air at the rear end of the train-pipe and its movement into the forward end.

In the conical bore of the valve-casing A is a plug B, which is hollow and open at the bottom. This plug has at its upper end a handle or lever C for turning it. The plug B is suitably supported in the valve-casing A by a cap $a$, washer $b$, and nut $c$, and is provided with ports and passages which communicate with the ports $d$, $h$, $i$, and $j$ in the valve-case A. Through the plug B and at one side of the center passes the supply-port $m$. (See Fig. 4.) When the plug is in one position, this port establishes communication between the train-pipe port $h$ and the main air-reservoir port $d$, thus allowing the air to pass from the said reservoir D to the train-pipe H, to charge the auxiliary reservoirs E and release the brakes. When the plug is in another position, this supply-port $m$ allows the air to pass from the main air-reservoir D to the engine or driver brake through the pipe I, thereby applying the said engine-brake. The exhaust-port M in the plug B extends up and down or lengthwise of the same, and opens through its base and communicates with the atmosphere.

Branching from this vertical port M are three lateral ports $n$ $o$ $p$, which pass through the wall of the plug. The smallest of these lateral parts is the uppermost one $n$, which will be again hereinafter referred to. The second and next in size is the graduating-port $o$, which, when brought opposite the train-pipe port $h$, reduces the pressure by allowing part of the train-pipe air to escape to the atmosphere, thus lightly applying the brakes. The third and largest port is the quick-action port $p$, which, when brought opposite the train-pipe port $h$, allows a considerable quantity of air to escape from the train-pipe to the atmosphere. The sudden reduction of the pressure in the train-pipe H that is thus effected will apply the brakes quickly. It will be seen that when the quick-action port $p$ of the plug is opposite the train-pipe port $h$ of the case the supply-port $m$ will establish communication between the main reservoir port $d$ and the engine-brake port $i$, thus allowing free flow of air from the main reservoir to the direct-acting engine-brake, thereby quickly applying the same.

A cross-groove or channel-way $q$ is in the outer surface of the wall of the plug B, (see Figs. 6 and 7,) and is so shaped that when the plug is in one position the said groove provides communication between the train-pipe port $h$ and the air-receiver port $j$ in the valve-case A. This position is termed the "blank" position, and the air-receiver groove $q$ is always brought to this blank position after allowing air to escape from the train-pipe H through the graduation-port $o$, when it is desired to maintain the brakes in a partial application. By establishing communication between the train-pipe H and air-receiver J at or after each graduation the expanding air that comes from the rear portion of a train-pipe will discharge into the air-receiver J, and thereby the forward movement of the said air in the train-pipe will be gradually stopped and there will be no releasing of the brakes connected with the forward end of the train-pipe H. This is an important feature of my invention.

The uppermost port $n$ in the plug B connects in the present instance with a lateral groove $n'$, which establishes communication between the air-receiver port $j$ and the atmosphere through the exhaust-port M, thereby allowing the air in the air-receiver J to escape into the atmosphere, thus exhausting or partially exhausting the said air-receiver and getting it ready to receive another charge of expanded train-pipe air. The air in the air-receiver escapes into the atmosphere when the valve-plug B is in position to allow the air to escape from the train-pipe to the atmosphere.

It will be seen that I have provided a small air-receiver J, and also means whereby air in the train-pipe may be discharged into said air-receiver when the discharge from the train-pipe to the atmosphere is cut off by the engineer's brake-valve, and thereby the forward movement of the air in the train-pipe will be gradually stopped and the release of the brakes on the forward part of a train avoided.

The particular manner here illustrated of establishing communication between the train-pipe and the air-receiver J, and when such communication is established through the engineer's brake-valve the form and arrangement of the ports and passages therein, may be modified or changed from that shown without departing from my invention.

Having described my invention, I claim—

1. The combination of a train-pipe, an engineer's brake-valve, and an air-receiver having such connection and relation to the said other parts that air may discharge from the train-pipe directly into the air-receiver when the air in the train-pipe moves toward the engineer's brake-valve.

2. A device to gradually stop the forward movement of compressed air in the train-pipe, comprising the combination of a train-pipe, an engineer's brake-valve, an air-receiver, and means to discharge the train-pipe air into the air-receiver when the discharge from the train-pipe to the atmosphere is cut off.

3. The combination of automatic brake mechanism on the cars, a train-pipe, the engineer's brake-valve having a blank position, and an air-receiver with which the train-pipe is put in communication when the said brake-valve has been turned to the blank position.

4. The combination of a train-pipe, an air-receiver for receiving expanded air from the train-pipe, and an engineer's brake-valve having ports and passages by which the train-pipe is put in communication with the air-receiver and by which air may be allowed to escape from the train-pipe and air-receiver simultaneously.

5. The combination of automatic brake mechanism on the cars, a train-pipe, an air-receiver, an engineer's brake-valve casing having ports and passages communicating with the said train-pipe and air-receiver, a valve to turn in said valve-casing and provided with ports and passages to communicate with the atmosphere and with the ports and passages of the valve-casing leading to the train-pipe and air-receiver, respectively.

6. The combination of the main air-reservoir, automatic brake mechanism on the cars, a train-pipe, an air-receiver, an engineer's brake-valve casing having ports and passages for communicating with the said main air-reservoir, the train-pipe, air-receiver, and an engine-brake, and a plug to turn in said valve-casing having ports and passages to establish communication between the said main air-reservoir, the train-pipe, air-receiver, an engine-brake, and the atmosphere.

7. The combination of the main air-reservoir, automatic brake mechanism on the cars, the train-pipe, an engineer's brake-valve casing having ports for communicating with said main air-reservoir, a direct-acting engine-brake, and the train-pipe, a plug to turn in said valve-casing and provided with a supply-port $m$, and a release-port $p$, which communicates with the atmosphere and so arranged that when the plug is in one position communication is established between the main air-reservoir and train-pipe through the said supply-port and also established between an engine-brake and the atmosphere through the said release-port, and when the plug is in another position communication is established between the main air-reservoir and an engine-brake through the supply-port and also established between the train-pipe and the atmosphere through the release-port $p$, for the purpose set forth.

8. The combination of the main air-reservoir, automatic brake mechanism on the cars, the train-pipe, an air-receiver, an engineer's brake-valve casing having ports and passages to communicate with said main air-reservoir, train-pipe, and air-receiver, a plug to turn in said engineer's valve-casing and provided with a supply-port $m$, a graduation-port $o$, and a groove $q$, all so arranged that when the plug is in one position communication is established between the main air-reservoir and train-pipe through the said supply-port, when in another position communication is established between the train-pipe and the atmosphere through the graduating-port $o$, and when in a third position communication is established between the train-pipe and air-receiver through the said groove $q$.

In testimony whereof I affix my signature in the presence of two witnesses.

GEORGE A. BOYDEN.

Witnesses:
A. O. BABENDREIER,
OTTO H. EHLERS.